United States Patent [19]
McCullough

[11] 3,922,104
[45] Nov. 25, 1975

[54] TENSION LINK CONTROL DEVICE

[75] Inventor: Thomas W. McCullough, San Francisco, Calif.

[73] Assignee: The United States of America as represented by the Secretary of the Navy, Washington, D.C.

[22] Filed: Sept. 20, 1974

[21] Appl. No.: 508,010

[52] U.S. Cl. .................. 403/2; 403/296; 285/2
[51] Int. Cl.² .................................. F16B 7/18
[58] Field of Search ....... 403/2, 296; 85/1 T; 285/2, 285/3, 4

[56] References Cited
UNITED STATES PATENTS

| | | | |
|---|---|---|---|
| 2,602,513 | 7/1952 | Conrad et al. | 285/4 X |
| 2,935,767 | 5/1960 | Naegeli | 403/296 X |
| 3,729,219 | 4/1973 | Crane | 403/296 X |
| 3,794,057 | 2/1974 | Badger | 285/4 X |

Primary Examiner—Andrew V. Kundrat
Attorney, Agent, or Firm—R. S. Sciascia; Charles D. B. Curry

[57] ABSTRACT

A tension link control device generally comprised of an inner cylinder and an outer cylinder with a uniquely configured fracture link connected therebetween. The link has a specially configured thread and cross sectional area which permits a considerable amount of axial play in the threads. Slots are provided at the interface end of the outer cylinder. Tapped holes are provided in the inner cylinder to align the slots. The inner cylinder has a flange which mates with the outer cylinder assembly. The axial compression loads are absorbed in the outer housing by allowing the cylinders to contact before axial play in the threads will allow compression to be transmitted to the fracture link.

2 Claims, 5 Drawing Figures

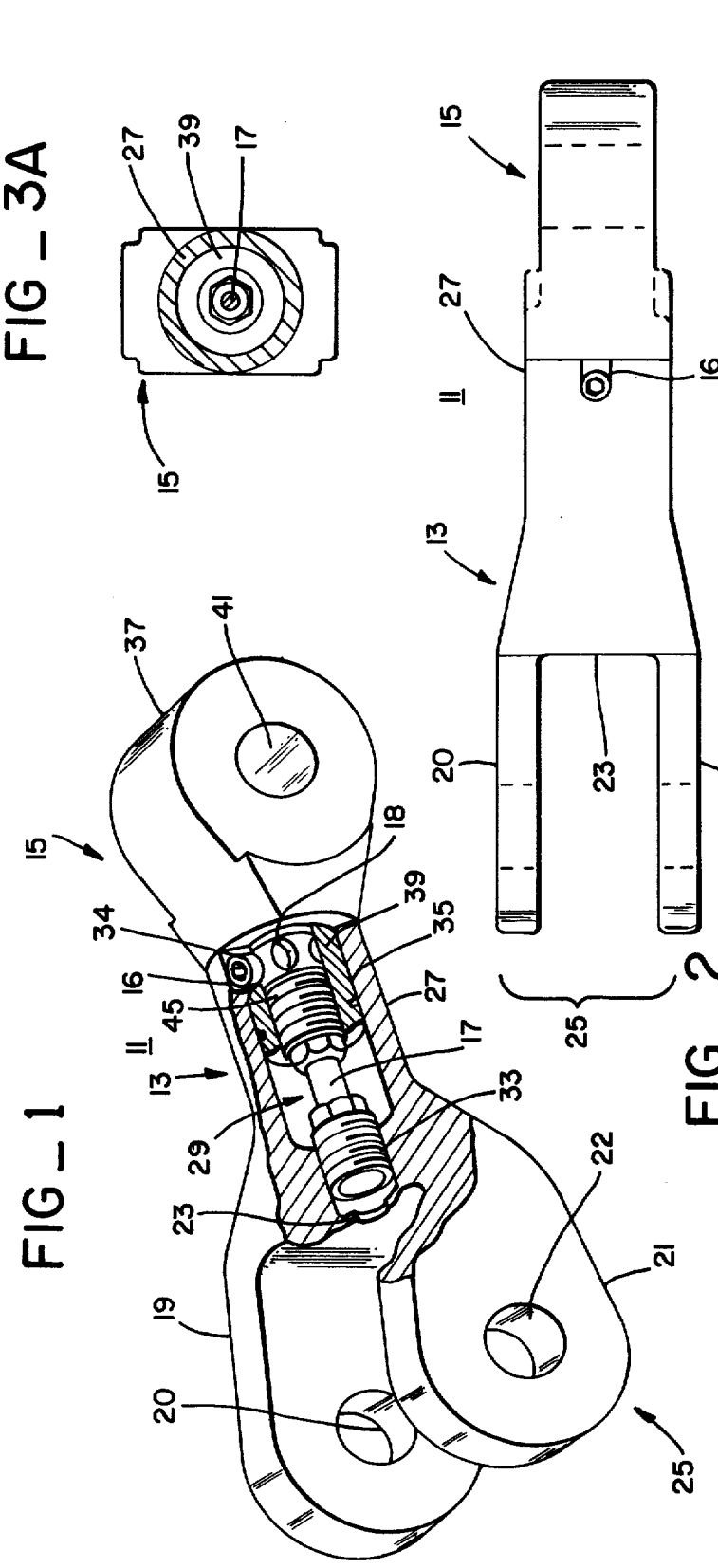
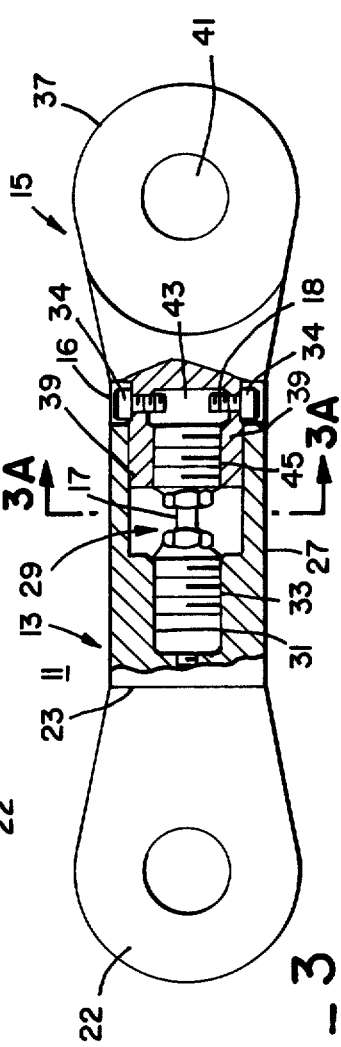
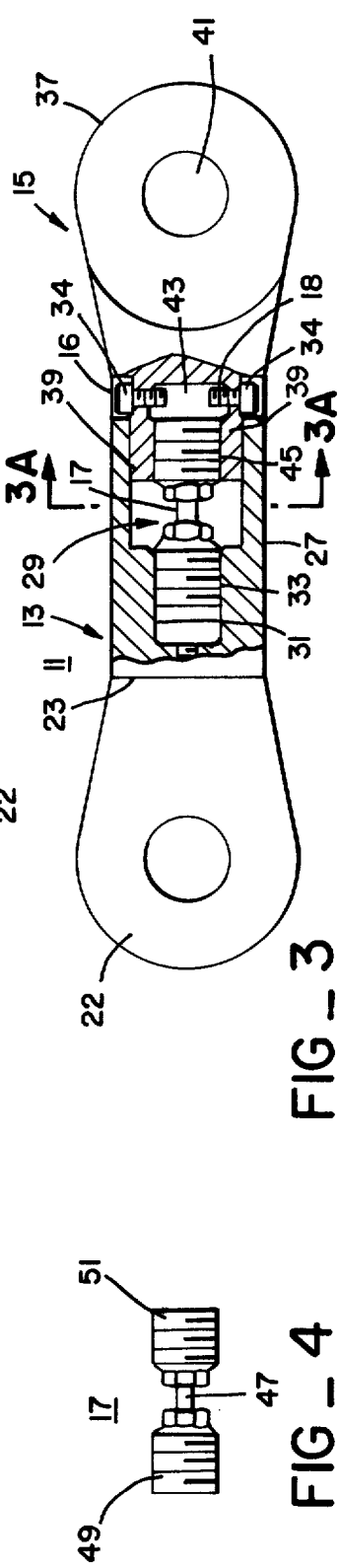

TENSION LINK CONTROL DEVICE

BACKGROUND OF THE INVENTION

1. Field of the Invention

The subject matter of the present invention relates generally to a tension link control device and more particularly to a tension link control device which protects a calibrated tension fracture link from all external forces except for tension loads applied to the fracture link.

2. Description of the Prior Art

The prior art devices available do not protect against excessive tensional loads. Moreover, the devices presently in use will fracture due to all other external loads except for design characteristic tension loading.

SUMMARY OF THE INVENTION

Briefly the present invention is a tension link control device generally comprised of an inner cylinder and an outer cylinder with a uniquely configured fracture link connected therebetween. The link has a specially configured thread and cross sectional area which permits a considerable amount of axial play in the threads. Slots are provided at the interface end of the outer cylinder. Tapped holes are provided in the inner cylinder to align the slots. The inner cylinder has a flange which mates with the outer cylinder assembly. The axial compression loads are absorbed in the outer housing by allowing the cylinders to contact before axial play in the threads will allow compression to be transmitted to the fracture link. The tension link control device is designed to protect a calibrated tension fracture link from all external forces except for tension forces.

STATEMENT OF THE OBJECTS OF THE INVENTION

A primary object of the present invention is to provide a tension fracture link assembly which protects the unique fracture link from all external loads except for tension loads applied to the fracture link.

Another object of the present invention is to provide a uniquely configured calibrated tension control link.

Other objects, advantages and novel features of the present invention will become apparent from the following detailed description of the invention when considered in conjunction with the accompanying drawings wherein:

BRIEF DESCRIPTION OF THE DRAWINGS

FIG. 1 is a perspective drawing of the tension link control device with significant parts being broken away for illustrating the fracture link assembly;

FIG. 2 is a top sectional view of the tension link control device illustrated in FIG. 1.

FIG. 3 is a side sectional view of the device illustrated in FIG. 1 with parts being broken away to particularly illustrate the unique fracture link assembly;

FIG. 3A is an end view taken along section lines 3A—3A of FIG. 2 and;

FIG. 4 is a perspective drawing of the tension link shown as a component part of the device illustrated in FIG. 1.

DESCRIPTION OF THE PREFERRED EMBODIMENT

Referring to FIGS. 1, 2 and 3 tension link control housing 11 is generally comprised of an outer cylinder 13, inner cylinder 15 and fracture link 17. Preferably, cylinders 13 and 15 are generally concentrically shaped hollow cylinders.

Outer cylinder 13 includes a first semi-circular bored member 19 and a second semi-circular bored member 21 with an apertured wall 23 therebetween, which forms a generally U-shaped coupling joint 25. Members 19 and 21 have bored openings 20 and 22 in the vertical wall structure, for acceptance of a compatible dynamic tension system coupling device which may be attached to any number of well known dynamic tension devices.

Outer cylinder 13 further includes a cylindrical shaped jacket 27 having a hollow tension link retention chamber 29. Retention chamber 29 contains an interior wall 31 which extends from apertured wall 23. Interior wall 31 is threaded at point 33 to accept fracture link 17. Slots 16 are provided at the interface area end 35 of outer cylinder 13.

Inner cylinder 15 is comprised of a body portion 37 and hollow extension sleeve 39 having tapped holes or slots 18. Tapped holes or slots 18 are provided in the inner cylinder 15 to align with the slots 16 of the outer cylinder 13 so that the inner cylinder 15, sleeve 39 mates with the outer cylinder 13 at the interface area 35 of outer cylinder 13. The mating parts preferably are retained in place by several cap screws 34. An O-ring seal may be used at interface area 35 if desired to provide environmental protection. Inner cylinder 15 further includes a bored section 41 for attachment to any number of connecting devices well known in the art. Extension sleeve 39 further includes hollow chamber 43 having threaded interior walls 45 for attachment with the fracture link 17.

Referring to FIG. 4, fracture link 17 is basically a short tubular shaped bar 47 with threaded ends 49 and 51, designed to be mounted on the axis of the tension load to be controlled. This is not in itself unique; however, in the case of tubular link 17 several features in combination yield a higher level of reliability when taken in combination with the unique tension link control housing 11. The following features are included in combination with housing 11. The cross sectional area of tubular bar 47 is smaller in diameter than the cross sectional area of threaded ends 49 and 51. This minimizes elastic and plastic deformation prior to failure. Threaded ends 49 and 51 are attached to tubular bar 47 by any number of well known methods. The calibrated fracture area of the bar 47 preferably should be finished to a high order of surface smoothness to eliminate stress concentration points. The proper finish can be achieved by well known low speed grinding methods such as honing, to minimize the effects of metal removed on the surface and subsurface crystalline structure. Further, it has been found that the bar 47 should be made of a chemically analyzed steel such as AMS 6444. Also, bar 47 should be heat treated to provide an essentially martensitic crystalline structure.

Fracture link 17 has a special thread pitch which permits a considerable amount of axial play in the threads. The play, in the case of this specific design, is about 0.07 inches. The actual play must be computed for each application based upon thread profile, thread pitch, material shear strength and design fracture loads. The play function may be computed using well known accepted engineering methods. Fracture link 17 is coated, during assembly, with a resilient compound such as Dab-seal or RTV silicone or their equivalents.

Threads 49 are then engaged full length with the mating surface at point 33 in outer cylinder 13. Thread 51 is coated with a silicone coating as described above and the inner cylinder 15 thread or threaded inner walls 45 are engaged with thread 51 of link 17 until the flange bottoms on the outer cylinder 13. Capscrews 34 are inserted through slots 16 of outer cylinder 13 into the mating holes 18 of inner cylinder 15. Referring to FIG. 1, in operation, the resilient thread compound will absorb shock loads due to any impact on the outer structure. Axial compression loads are absorbed in the outer housing 11 since cylinders 13 and 15 will contact before the axial play in threads 49 and 51 will allow compression to be transmitted to fracture link 17. Torsional forces are transmitted from one cylinder to the other through capscrews 34 in the slots 16. When the fracture link 17 breaks, the cylinders 13 and 15 separate without obstruction.

The unique assembly insures that loads other than the ones which link 17 controls do not affect the breaking point of link 17. Additionally, the original condition of link 17 cannot deteriorate as a result of severe service or corrosion. Although the assembly 11 was uniquely designed to accomodate special link 17, its advantages apply equally to any device which must be isolated from all forces except tension.

What is claimed:

1. A tension link control device comprising:
   a. first and second force transmitting means;
   b. said first force transmitting means having first and second sections, said first section including at least one force transmitting element, and said second section including a hollow cylindrical member and a threaded member;
   c. said second force transmitting member having first and second sections, said first section including at least one force transmitting element, and said second section including a hollow cylindrical means;
   d. the inside diameter of the hollow cylindrical member being greater than the outside diameter of said hollow cylindrical means;
   e. said hollow cylindrical means including inside threads and being inserted into one end of said hollow cylindrical member;
   f. a frangible tension link comprising a cylindrical member having a first threaded end and a second threaded end with a reduced portion therebetween;
   g. said first threaded end being in engagement with said threaded member of said first force transmitting means and said second threaded end being in engagement with said inside threads of said second force transmitting means;
   h. torsional means for transmitting a torque between said first and second force transmitting means independent of said first and second threaded ends; whereby
   i. said threads of said first and second threaded ends are selected to have a pitch that permits a considerable amount of axial play with respect to the threads of said threaded member and said inside threads respectively for transmitting tension loads between said first and second force transmitting means;
   j. a plurality of slots arranged radially in the cylindrical member of said first force transmitting means;
   k. a plurality of tapped holes corresponding to said slots and arranged radially in said hollow cylindrical means of said second force transmitting means;
   l. attaching means for maintaining each of said slots and tapped holes in a fixed relationship; whereby
   m. torsional forces applied to said first force transmitting means are transferred to said second force transmitting means without transfer of any of said force to said tension link.

2. The device of claim 1, including:
   a. a shoulder formed in said second force transmitting means;
   b. the end of said cylindrical member of said first force transmitting means abutting against said shoulder; whereby
   c. compression and bending forces applied to said first force transmitting means are transferred to said second force transmitting means without transfer of any of said force to said tension link.

* * * * *